United States Patent
Seguin et al.

(10) Patent No.: US 10,017,637 B2
(45) Date of Patent: Jul. 10, 2018

(54) COMPOSITION COMPRISING A PHENOLIC RESIN, COMPOSITE MATERIAL COMPRISING SUCH A COMPOSITION AND PROCESS FOR PREPARING A COMPOSITE MATERIAL

(71) Applicants: Pascal Seguin, Coignieres (FR);
Jean-Loup Servouse, Toulouse (FR);
Hubert Bouillon, Faro (PT)

(72) Inventors: Pascal Seguin, Coignieres (FR);
Jean-Loup Servouse, Toulouse (FR);
Hubert Bouillon, Faro (PT)

( * ) Notice: Subject to any disclaimer, the term of this patent is extended or adjusted under 35 U.S.C. 154(b) by 157 days.

(21) Appl. No.: 14/896,792

(22) PCT Filed: Dec. 17, 2013

(86) PCT No.: PCT/FR2013/053141
§ 371 (c)(1),
(2) Date: Dec. 8, 2015

(87) PCT Pub. No.: WO2014/096685
PCT Pub. Date: Jun. 26, 2014

(65) Prior Publication Data
US 2016/0122529 A1  May 5, 2016

(30) Foreign Application Priority Data
Dec. 18, 2012  (FR) ...................................... 12 62251

(51) Int. Cl.
C08L 65/02 (2006.01)
C08J 9/42 (2006.01)
B32B 3/12 (2006.01)
(Continued)

(52) U.S. Cl.
CPC ............... *C08L 65/02* (2013.01); *B32B 3/12* (2013.01); *C08G 8/00* (2013.01); *C08J 9/42* (2013.01);
(Continued)

(58) Field of Classification Search
CPC ... C08G 8/00; C08K 3/00; C08K 7/28; C08K 7/26; B32B 2264/10; B32B 2260/046;
(Continued)

(56) References Cited

U.S. PATENT DOCUMENTS 3,655,609 A    4/1972  Evans et al.
5,384,345 A *  1/1995  Naton ...................... C08J 5/125
                                                    156/307.5

(Continued)

FOREIGN PATENT DOCUMENTS

DE         41 35 678 A1    5/1993
DE    10 2006 044486 A1    4/2009
(Continued)

OTHER PUBLICATIONS

International Search Report, dated Aug. 7, 2014, from corresponding PCT application.

*Primary Examiner* — Camie S Thompson
(74) *Attorney, Agent, or Firm* — Young & Thompson

(57) ABSTRACT

The composition includes: at least one binder chosen from phenolic resins, and particles formed from at least one pulverulent solid chosen from glass, polymers and silica, and mixtures thereof, the particles having an average size of less than 1 mm, wherein the composition includes between 34% and 50% by weight of the pulverulent material relative to the total weight of the composition. A sandwich composite material including such a composition and a process for preparing such a sandwich composite material are also described.

5 Claims, 1 Drawing Sheet

Figure 1:
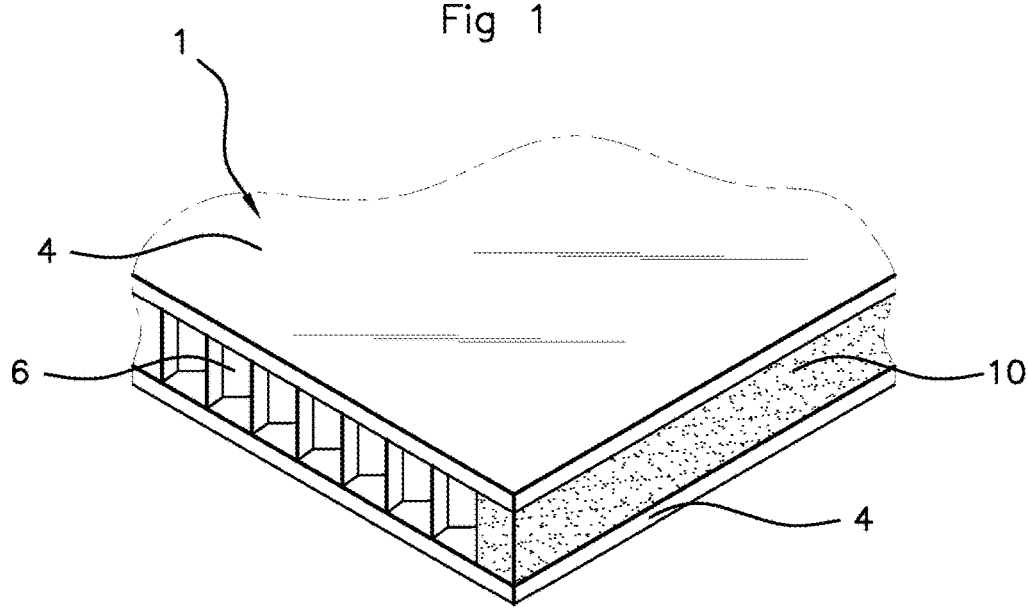

(51) Int. Cl.
*C08K 7/28* (2006.01)
*C08K 3/00* (2018.01)
*C08G 8/00* (2006.01)
*C08L 61/04* (2006.01)

(52) U.S. Cl.
CPC .................. *C08K 3/00* (2013.01); *C08K 7/28* (2013.01); *C08L 61/04* (2013.01); *B32B 2250/03* (2013.01); *B32B 2260/046* (2013.01); *B32B 2264/02* (2013.01); *B32B 2264/10* (2013.01); *B32B 2307/3065* (2013.01); *B32B 2307/50* (2013.01); *B32B 2605/00* (2013.01)

(58) Field of Classification Search
CPC ..... B32B 2307/3065; B32B 3/12; B32B 5/28; B32B 27/18; B32B 2250/03; B29L 2031/608; Y10T 428/24149; Y10T 428/269; C08L 1/04
USPC .................... 428/116, 117; 521/56; 523/218; 427/385.5
See application file for complete search history.

(56) References Cited

U.S. PATENT DOCUMENTS

| | | | | |
|---|---|---|---|---|
| 2003/0198780 | A1* | 10/2003 | Campese | B29C 70/025 428/141 |
| 2004/0033905 | A1* | 2/2004 | Shinbach | C09K 8/03 507/100 |
| 2014/0037894 | A1* | 2/2014 | Higuchi | C08J 9/0085 428/117 |
| 2014/0113104 | A1* | 4/2014 | Rozant | B32B 3/12 428/116 |

FOREIGN PATENT DOCUMENTS

| | | |
|---|---|---|
| GB | 2 359 085 A | 8/2001 |
| JP | 2011 241267 A | 12/2011 |
| JP | 2011 241268 A | 12/2011 |
| JP | 2011 241269 A | 12/2011 |
| RU | 2186 799 C2 | 8/2002 |

\* cited by examiner

COMPOSITION COMPRISING A PHENOLIC RESIN, COMPOSITE MATERIAL COMPRISING SUCH A COMPOSITION AND PROCESS FOR PREPARING A COMPOSITE MATERIAL

The invention relates to a composition comprising a phenolic resin. The invention relates also to a composite sandwich material comprising such a composition, and to a process for preparing such a composite sandwich material.

The reliability of the materials used in the furnishings and fittings sector, and even more so in the field of aircraft, maritime or railway construction, is of the utmost importance in terms of safety. In particular, the mechanical and fire resistance properties must be maximised while limiting the weight of each structural or functional element.

It is known that materials based on phenolic resin have very good heat and fire resistance, are self-extinguishing and do not give off toxic fumes. However, such materials are at present used very little owing to the many disadvantages associated with their use, especially their poor ability to be shaped and their tendency to foam, in favour of the epoxy resins, for example, whose fire resistance properties are substantially poorer.

There is known from RU 2186799 a cold cure polymer composite material comprising a resol phenolic plastic, a curing agent, a plasticiser and hollow microspheres. According to RU 2186799, from 15 to 25 parts by weight of plasticiser and from 40 to 50 parts by weight of hollow microspheres are necessary for 100 parts by weight of resol phenolic plastic. A material according to RU 2186799 thus comprises from 24 wt. % to 29 wt. % hollow microspheres and from 9 wt. % to 15 wt. % plasticiser, based on the total weight of said material.

However, the addition of such proportions of a plasticiser lowers considerably the fire resistance of the composite polymer material that is prepared. Furthermore, such a formulation does not allow foaming of the phenolic resin to be avoided, making the material difficult to use for applications in high-performance materials such as materials intended for the aircraft field. The formation of foam can in fact deform the materials within which or in contact with which it is used, and the foam that forms has very poor mechanical properties, even in the presence of fillers of hollow microspheres.

Within this context, the invention aims to remedy those disadvantages and propose a composition with which:
- a composite sandwich material can be reinforced mechanically, especially during the machining or repair of a panel made of composite sandwich material,
- the formation of foam by the phenolic resin can be avoided,
- the fire resistance of a composite sandwich material can be improved and its flammability can be reduced,
- the emission of toxic fumes from a composite sandwich material in the event of fire can be reduced,
- the mechanical strength and the fire resistance of the ends of a panel made of composite sandwich material can be reinforced locally,
- a plurality of panels of composite sandwich material can be joined together,
- a metal insert can be fixed within said composite sandwich material.

To that end, the invention relates to a composition comprising:
- at least one binder chosen from the phenolic resins,
- particles formed of at least one pulverulent solid chosen from glass, polymers, silica and mixtures thereof, said particles having an average size of less than 1 mm, characterised in that it comprises from 34 wt. % to 50 wt. % of said pulverulent solid, based on the total weight of said composition.

Furthermore, advantageously and according to the invention, such a composition is free of catalyst of said binder. The invention therefore relates also to a composition composed of:
- from 55% to 66% of at least one binder chosen from the phenolic resins,
- from 34 wt. % to 50 wt. % particles formed of at least one pulverulent solid, based on the total weight of said composition, said pulverulent solid being chosen from glass, polymers, silica and mixtures thereof, and said particles having an average size of less than 1 mm.

In particular, the invention relates to a composition comprising:
- at least one binder chosen from the phenolic resins,
- particles of phenolic resin as the pulverulent solid, said particles having an average size of less than 1 mm, characterised in that it comprises from 34 wt. % to 50 wt. % particles of phenolic resin, based on the total weight of said composition.

The inventors have in fact found, surprisingly, that it is possible to incorporate such a percentage by weight of a pulverulent solid into a composition based on phenolic resin without lowering the final properties of the phenolic resin and especially the fire resistance. Furthermore, the incorporation of such a percentage by weight of at least one pulverulent material into a composition based on phenolic resin allows foaming of the phenolic resin to be avoided, thus avoiding the reduction of the physico-chemical and mechanical properties and the possible deformation of the material in contact therewith due to the increase in volume caused by foaming. There is as yet no scientific explanation which can explain such a result with certainty. On the contrary, it may even have been thought that adding a pulverulent solid to a composition based on phenolic resin would rather have resulted in an increase in such foaming.

Throughout the text, "phenolic resin" means any precursor compound of a polymer material comprising at least one phenol group or, more particularly, any polymer comprising at least one phenol group.

In particular, a phenolic resin used in a composition according to the invention comprises at least one group of the following chemical formula (I):

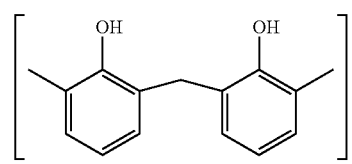

Throughout the text, "polymerised phenolic resin" means any polymer material of chemical formula (I) which is at least partially crosslinked, that is to say forms a three-dimensional network (thermosetting polymer).

Advantageously and according to the invention, the phenolic resins are obtained by polycondensation of formaldehyde (formol) and phenol and/or a phenol derivative. Said phenol derivative is chosen from cresol, resorcinol, xylenol and mixtures thereof.

A composition according to the invention may comprise any type(s) of phenolic resin as binder for the particles of pulverulent solid(s). The proportion of phenolic resin(s) is intimately linked to the proportion of pulverulent solid(s). Advantageously and according to the invention, said composition comprises from 50 wt. % to 66 wt. % of said binder, based on the total weight of said composition, and in particular from 55 wt. % to 65 wt. % of said binder, based on the total weight of said composition. Accordingly, a composition according to the invention requires only a small number of ingredients, that is to say at least one binder chosen from the phenolic resins and at least one pulverulent solid chosen from glass, polymers, silica and mixtures thereof.

Each binder has a viscosity adapted to permit substantially homogeneous mixing with the particles of pulverulent solid(s). Advantageously and according to the invention, the binder used has a viscosity of from 50 mPa·s to 500 mPa·s, especially a viscosity of from 150 mPa·s to 350 mPa·s The proportion of pulverulent solid in a composition according to the invention is adapted to improve the fire resistance of a composition according to the invention while limiting or reducing the mass per unit volume (or the density) of the composition and permitting the preparation of a composition having a consistency adapted to all types of application (before complete polymerisation) and good mechanical properties (after polymerisation). A composition according to the invention comprises a relatively large proportion of pulverulent solid, especially from 34 wt. % to 50 wt. % of said pulverulent solid, based on the total weight of said composition. In particular, advantageously and according to the invention, said composition comprises from 35 wt. % to 47 wt. % of said pulverulent solid, based on the total weight of said composition, and in particular from 37 wt. % to 45 wt. % of said pulverulent solid, based on the total weight of said composition.

A composition according to the invention has a ratio by mass pulverulent solid/binder (or pulverulent solid(s)/phenolic resin(s)) of from 0.55 to 0.9. In particular, advantageously and according to the invention, said composition has a ratio by mass pulverulent solid/binder (or pulverulent solid/phenolic resin) of from 0.6 to 0.9, especially from 0.6 to 0.75. In other words, advantageously and according to the invention, said composition comprises from 60 wt. % to 90 wt. % of said pulverulent solid, based on the weight of said binder. In particular, said composition comprises from 60 wt. % to 75 wt. % of said pulverulent solid, based on the weight of said binder (that is to say phenolic resin).

A composition according to the invention therefore also comprises, in addition to at least one binder, particles formed of at least one pulverulent solid chosen from glass, polymers, silica and mixtures thereof.

In particular, said particles formed of at least one pulverulent solid are adapted to improve the fire resistance of a composition according to the invention. Said particles formed of at least one pulverulent solid may therefore be formed of at least one material chosen from the group formed of glass, polymers and silica (silicon oxide).

Said particles formed of at least one pulverulent solid may be in any form, while remaining adapted to be able to form a substantially homogeneous mixture with the binder(s). The particles formed of at least one pulverulent solid may, for example, be in the form of hollow or solid beads, cubes, tubes, rods, or threads or filaments. Advantageously and according to the invention, said particles formed of at least one pulverulent solid are hollow particles, preferably mainly at least substantially spherical.

In particular, advantageously and according to the invention, the pulverulent solid is chosen from polymeric particles. All types of polymeric particles may be used as the pulverulent solid, especially particles formed of at least one polymer, especially at least one thermosetting polymer. Advantageously and according to the invention, said polymeric particles are chosen from polymeric particles that are fireproof or have improved fire resistance or resistance to high temperatures.

Advantageously and according to the invention, said particles formed of at least one pulverulent solid are chosen from particles of phenolic resin. Advantageously and according to the invention, said polymeric particles are chosen from particles based on phenolic resin. Advantageously and according to the invention, the composition comprises at least 10 wt. % particles of phenolic resin, as the pulverulent solid, based on the total weight of said composition. A composition according to the invention comprising particles of phenolic resin as the pulverulent solid has a lower mass per unit volume than with other particles such as glass, and also has better fire resistance.

In particular, advantageously and according to the invention, the pulverulent solid is chosen from particles of silica, especially particles of pyrogenic silica, particles of precipitated silica or particles named fumed silica particles.

Furthermore, it is of course possible to use, as the pulverulent material, a mixture of particles chosen from glass, polymers and silica. In a particularly advantageous variant embodiment of a composition according to the invention, said pulverulent material comprises at least particles of glass and polymeric particles, in particular particles of phenolic resin. A composition according to the invention comprises, for example, from 10% to 30% particles of phenolic resin and from 4% to 40% particles formed of at least one pulverulent solid chosen from glass, polymers, silica and mixtures thereof.

Advantageously and according to the invention, said particles have an average size (or average equivalent spherical diameter) of less than 1 mm. Furthermore, advantageously and according to the invention, said particles formed of at least one pulverulent solid have an average diameter of from 20 µm to 200 µm, in particular from 40 µm to 150 µm. The average diameter of the particles can be measured by screening or by laser diffraction. The average diameter of the particles is preferably measured by screening.

Advantageously and according to the invention, said particles formed of at least one pulverulent solid have an apparent density of from 0.05 to 0.7. In particular, advantageously and according to the invention, said particles formed of at least one pulverulent solid have an apparent density of from 0.1 to 0.6 and more particularly from 0.1 to 0.4. Said particles formed of at least one pulverulent solid thus allow the density (and the mass per unit volume) of the composition according to the invention to be lowered.

Throughout the text, apparent density refers to the density of a bulk pulverulent solid, that is to say the apparent mass per unit volume of said pulverulent solid (mass of said pulverulent material/volume occupied by that mass) over the mass per unit volume of pure water at 4° C. The apparent density of a pulverulent solid is preferably measured in accordance with standard ISO 3923/2.

The use of particles having such a low apparent density allows the mass per unit volume of a composition according to the invention to be reduced, said particles having a mass per unit volume which is lower than that of the phenolic resin(s) used as binder. Such particles having a low density further make it possible to limit considerably the increase in weight of the parts of composite sandwich material to which the composition according to the invention is added.

Thus, advantageously and according to the invention, a composition according to the invention has a density of from 0.15 to 0.9, in particular from 0.2 to 0.7 and more particularly from 0.4 to 0.6 (before or after a step of polymerisation).

Moreover, a composition according to the invention requires only a small number of ingredients and is simple and rapid to prepare on an industrial scale.

Thus, in particular, advantageously and according to the invention, said composition is free of plasticiser. Plasticisers are readily flammable compounds, and the use of plasticiser(s) has the disadvantage of significantly reducing the fire resistance. Throughout the text, "plasticiser" denotes any compound of low or negligible volatility which is added to a polymer material so as to reduce the interactions between the polymer chains and lower the glass transition temperature of a polymer.

In view of the fact that other compounds such as plasticisers are not added, the fire resistance of a composition according to the invention is therefore not likely to be altered.

A composition according to the invention may, however, optionally comprise one or more additives or other fillers such as mineral particles (for example oxides, carbonates, borates, silicates, or marble powder). In particular, said additives and fillers are chosen from additives and fillers which are not likely to reduce the fire resistance of a composition according to the invention. In particular, a composition according to the invention comprises less than 10 wt. %, and especially less than 5 wt. %, of said additives or fillers (other than the particles formed of at least one pulverulent solid), based on the total weight of said composition.

Furthermore, it is not absolutely necessary to add to the composition according to the invention a catalyst (or a curing agent) of the polymerisation reaction of the phenolic resin. Such a catalyst may, however, be used when it is necessary, for example, precisely to control the duration and/or the temperature of polymerisation of the phenolic resin or to accelerate said polymerisation. Advantageously and according to the invention, said composition comprises from 1 wt. % to 12 wt. %, in particular from 2 wt. % to 8 wt. %, of a catalyst, based on the total weight of the composition.

Said catalyst is chosen from compounds which are catalysts of the polycondensation reaction of phenolic resins. Advantageously and according to the invention, said catalyst is chosen from mixtures of acids. In particular, advantageously and according to the invention, said catalyst comprises at least one xylenesulfonic acid and at least one phosphoric acid.

Advantageously and according to the invention, said composition is free of catalyst (and curing agent) of the phenolic resin. This has the advantage of avoiding the need to handle catalysts or curing agents, the handling and use of which require special precautions for operators. This also avoids reducing considerably the lifetime of the composition comprising the phenolic resin once the catalyst has been added thereto.

The invention relates also to a composite sandwich material comprising at least one cellular material having voids, said cellular material being arranged between at least two outer skins, each outer skin being formed of at least one composite material comprising at least one reinforcement in the form of fibres and at least one polymer material, named the polymer matrix, within which the fibres extend, characterised in that it comprises a composition according to the invention arranged within at least some of the voids of said cellular material.

A composition according to the invention may be used for any type of composite material. In particular, advantageously and according to the invention, said cellular material is chosen from materials having a honeycomb structure.

The invention relates to a process for preparing a material, named a composite sandwich material, comprising at least one cellular material having voids which is arranged between at least two outer skins, each outer skin being formed of at least one composite material comprising at least one reinforcement in the form of fibres and at least one polymer material, named the polymer matrix, within which the fibres extend,
wherein:
  there is prepared a composition comprising:
    at least one binder chosen from the phenolic resins,
    from 34 wt. % to 50 wt. % particles formed of at least one pulverulent solid chosen from glass, polymers, silica and mixtures thereof, based on the total weight of the composition, said particles having an average size of less than 1 mm,
  said composition is arranged within at least some of the voids of said cellular material,
  polymerisation of said binder is carried out at a temperature of from 110° C. to 250° C.

Thus, a composition according to the invention may be used in any composite sandwich material as a composition for filling or local reinforcement (edges of a panel, joint between two panels, etc.).

Furthermore, a composite sandwich material comprising a composition according to the invention has improved fire resistance. A composite sandwich material according to the invention also has improved barrier properties to fire and improved thermal insulation properties.

In particular, such a composite sandwich material has very good results in fire resistance tests such as the tests in which a portion of said panel is exposed to a flame, such as a flame formed by a Bunsen burner, for example for 60 seconds. The inventors have in fact observed that the portions of said panel in which the voids are filled with a composition according to the invention have better fire resistance than the portions of said panel in which the voids are not filled with a composition according to the invention (for the very same panel).

A composite sandwich material comprising a composition according to the invention also has very good results in heat generation tests of the OSU (Ohio State University, USA) type, in which the material is exposed to a radiant heat source.

Advantageously and according to the invention, at least some of the voids of said cellular material are filled with said composition.

Advantageously and according to the invention, after the composition has been arranged, at the desired location, within the voids of said cellular material, said composite sandwich material is subjected to a step of polymerisation which allows the phenolic resin and optionally the polymer matrix of the outer skins of the composite sandwich material to cure.

Thus, advantageously and according to the invention, said composite sandwich material is then subjected to a temperature of from 15° C. to 250° C., especially from 120° C. to 180° C., and to a pressure of from 0.1 1mPa to 3 MPa, and especially from 100,000 Pa to 700,000 Pa.

It is also possible to carry out the step of heating (polymerisation) of the binder, and where appropriate of the polymer matrix of said composite material, in vacuo, that is to say especially at a pressure of from 0.0001 Pa to 1000 Pa, and in particular at a pressure of from 10 Pa to 100 Pa. The vacuum is generally formed by means of a vacuum pump connected to a vacuum bag in which the material to be polymerised is arranged.

In an autoclave, it is thus possible to arrange the material to be polymerised in vacuo and, in addition, to apply to the material (in the chamber of the autoclave) an external pressure that is greater than atmospheric pressure.

Advantageously and according to the invention, polymerisation of said binder and polymerisation of the polymer matrix of said composite material are carried out simultaneously at a temperature of from 110° C. to 250° C. The inventors have in fact found, surprisingly, that it is possible to carry out polymerisation (or curing) of the binder based on phenolic resin and also of the polymer matrix of the outer skins of the composite material in the course of the very same heating step. It is thus possible to omit one or often even several prior steps of polymerisation, contrary to the processes for preparing composite sandwich materials according to the prior art. The use of a composition according to the invention that is free of catalyst effectively allows the binder and the polymer matrix of the outer skins of the composite material to be polymerised in the very same step, at a temperature of from 110° C. to 250° C., without causing any problem of foaming or any problem of flow or leakage of the composition between the cellular material and the outer skins of the composite material during the polymerisation.

According to a particularly preferred embodiment of the invention, the phenolic resin is polymerised at a temperature of from 150° C. to 220° C. and preferably from 155° C. to 170° C. It is thus possible, for example, to carry out the polymerisation of the phenolic resin of the composition according to the invention and the polymerisation of the polymer matrix of the outer skins of the composite sandwich material, for example an epoxy resin, simultaneously in the very same step of polymerisation.

After application of the composition within a material, such as a composite sandwich material, the composition according to the invention can be subjected to a step of polymerisation so as to permit at least partial polymerisation of the phenolic resin of the composition. In particular, the time for which the polymerisation is carried out, as well as the temperature and the pressure at which the polymerisation of the composition according to the invention is carried out, are chosen so as to permit at least partial polymerisation of said phenolic resin and optionally of the other polymer materials. Advantageously and according to the invention, said step of polymerisation of the phenolic resin is carried out for a period of from 10 minutes to 8 hours, especially from 10 minutes to 5 hours, in particular from 30 minutes to 3 hours.

Advantageously and according to the invention, said step of polymerisation of the phenolic resin is carried out in an autoclave, an oven, or in a furnace.

According to another advantageous embodiment of the invention, the phenolic resin is polymerised at ambient temperature (from 20° C. to 25° C.).

Furthermore, advantageously and according to the invention, the step of polymerisation is carried out in the presence of a degree of moisture of from 20% to 90%, preferably from 40% to 80%. "Degree of moisture of the air" is understood as being the mass of water vapour (g)/unit mass of dry air (g), expressed as a percentage.

The invention relates also to a composition, a composite sandwich material and a process for preparing such a composite sandwich material, characterised in combination by all or some of the features mentioned hereinabove or hereinbelow.

Figure 2:
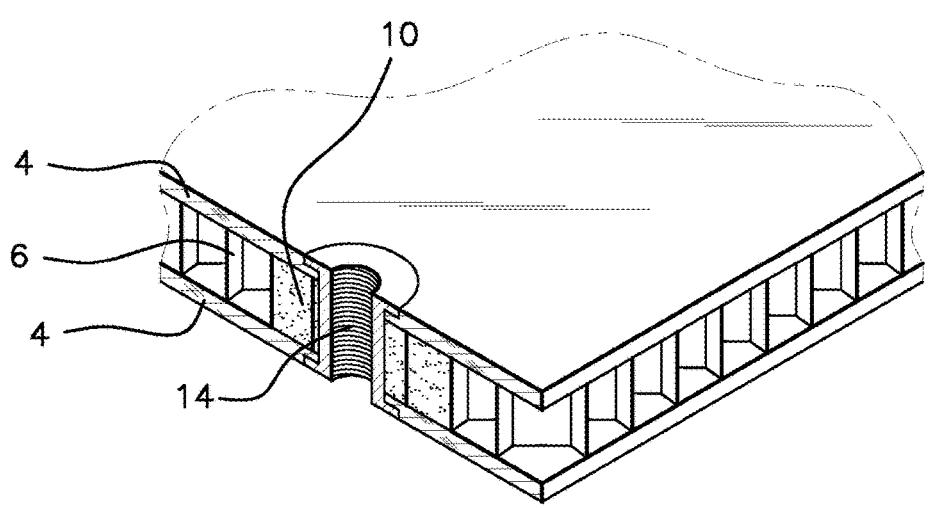

Other objects, features and advantages of the invention will become apparent from reading the following description of a preferred embodiment thereof, which is given by way of a non-limiting example and which refers to the accompanying drawings, in which:

FIG. 1 is a schematic view of a composite sandwich material according to a first embodiment of the invention, FIG. 2 is a schematic view of a composite sandwich material according to a second embodiment of the invention.

A composition according to the invention is prepared by mixing at least one binder chosen from the phenolic resins with particles, preferably spherical particles, formed of at least one pulverulent solid chosen from glass, polymers, silica and mixtures thereof, said particles having an average size of less than 1 mm. A composition according to the invention is in particular characterised in that it comprises from 34 wt. % to 50 wt. % of said pulverulent material, based on the total weight of the composition.

The binder is chosen from the phenolic resins, which are obtained by polycondensation of formaldehyde (formol) and phenol and/or a phenol derivative such as cresol, resorcinol or xylenol.

The binder may be composed, for example, of at least one phenolic resin such as the resins CELLOBOND® J2042L®, J2027L® or J2018L® marketed by HEXION (Sully, WALES) or a resin FXFNO26® marketed by SI GROUP (Schenectady, USA).

The particles formed of at least one pulverulent solid are hollow or solid. In a particularly advantageous embodiment according to the invention, the particles formed of at least one pulverulent solid are hollow. In a particularly advantageous embodiment of a composition according to the invention, said particles formed of at least one pulverulent solid have an average diameter of less than 1 mm, especially from 20 µm to 200 µm and in particular from 40 µm to 150 µm.

In a particularly advantageous variant of a composition according to the invention, the particles formed of at least one pulverulent solid are hollow or solid glass beads, preferably hollow glass beads.

In a particularly advantageous variant of a composition according to the invention, the polymeric particles are chosen from particles based on phenolic resin. Such particles in fact have good compatibility with the binder, a lower density than glass beads and improved fire resistance.

Particles of silica include, for example, particles of pyrogenic silica, particles of precipitated silica or particles named fumed silica particles.

The phenolic resin and the pulverulent solid(s) can be brought into contact by means of any device adapted to bring the binder and the particles formed of at least one pulverulent solid into contact and, preferably, adapted for preparing a homogeneous mixture of said binder and said particles. In order to permit the preparation of a homogeneous composition, it is preferable to use a mixer or kneader, such as a RUBIMIX® L-120-R liquid kneader marketed by RUBI (Rubi, Spain).

The binder and the particles formed of at least one pulverulent solid may, if required, further be heated gently (for example at from 20° C. to 50° C., especially from 25°

C. to 30° C.) before and/or during mixing so as to accelerate and facilitate the preparation of a homogeneous mixture.

In a particularly advantageous embodiment, a composition according to the invention is arranged within at least some of the voids of a cellular material, said cellular material being arranged between at least two outer skins of a composite sandwich material, each outer skin being formed of at least one composite material comprising at least one reinforcement in the form of fibres and at least one polymer material, named the polymer matrix, within which the fibres extend.

The cellular material is preferably chosen from materials having a honeycomb structure (also called "NIDA"). It is, for example, NIDA NOMEX®, which is formed of a matrix of phenolic resin and aramid fibres and is marketed by HEXCEL (Sully, WALES).

The composition according to the invention is arranged, at the desired location, within the voids of the cellular material, and the composite sandwich material is subjected to a step of polymerisation, which allows the phenolic resin and optionally simultaneously the polymer matrix of the outer skins of the composite sandwich material to cure.

Polymerisation of the phenolic resin can be carried out at ambient temperature or at a temperature above ambient temperature and at atmospheric pressure or at a pressure above atmospheric pressure. In particular, the temperature is from 15° C. to 250° C. and the pressure is from 100,000 Pa to 700,000 Pa.

According to a particularly advantageous embodiment of the invention, the phenolic resin is polymerised at a temperature of from 150° C. to 220° C. and preferably from 155° C. to 170° C. It is thus possible to carry out simultaneously the polymerisation of the phenolic resin and the polymerisation of the polymer matrix of the outer skins of the composite sandwich material, for example an epoxy resin.

The step of polymerisation of the phenolic resin is carried out for a duration which is adapted to permit curing of the phenolic resin, especially a duration of from 10 minutes to 5 hours, preferably from 30 minutes to 3 hours.

The step of polymerisation of a composition according to the invention is, for example, carried out in an oven at 160° C. for 1 hour.

The step of polymerisation of the phenolic resin is carried out in an autoclave, an oven or in a furnace, according to the chosen temperature and pressure.

In the presence of a catalyst of polymerisation of the phenolic resin, the phenolic resin can be polymerised at ambient temperature (from 20° C. to 25° C.).

It should further be noted that, before the polymerisation of the phenolic resin, the composition according to the invention is advantageously in the form of a paste, the viscosity of which may vary according to the nature and proportions of the binder and solid particles used. The composition according to the invention preferably has a viscosity of from 300 mPa·s to 700 mPa·s.

In a first embodiment shown in FIG. 1, the composition 10 according to the invention is arranged at the edge of a composite sandwich panel 1 comprising a cellular material 6, which forms the honeycomb core of the panel 1, and two outer skins 4 formed of a composite material comprising, for example, carbon fibres within a polymer matrix such as an epoxy resin. The composite sandwich panel 1has, for example, a total thickness of from 3 mm to 45 mm. The composition 10 according to the invention is arranged along the entire edge of the panel 1, over the entire thickness of the panel and, for example, over a width of 1.5 cm (that is to say 1.5 cm from an outside edge of the panel). The width over which the composition is arranged depends on the type of composite sandwich panel prepared and is, for example, adapted to fill at least one and a half cells of the honeycomb core of the panel 1 from the outside edge of the panel. A composition according to the invention thus both allows the edges of a composite sandwich panel to be reinforced mechanically and allows the fire resistance of the composite sandwich panel to be improved, without significantly increasing the mass of said panel.

In a second embodiment shown in FIG. 2, the composition 10 according to the invention is arranged around an insert 14 made of polymer or metal material. The insert 14 (of the "spool insert" type) has, for example, a diameter of 10 mm, the ends of which in the form of discs have a diameter of 20 mm. A hole has first been formed by cutting in the thickness of the composite sandwich panel, and then an insert has been introduced and fixed by means of the pasty composition according to the invention. The composition has been applied so as to surround the insert and fill at least partially the voids adjacent to the insert in a radius of from 20 mm to 30 mm around the insert, that is to say so as to produce an edging for the insert having a diameter at least equal to twice the diameter of the insert. The composition according to the invention is thus applied, for example, in a radius of at least 15 mm around the insert.

A composition according to the invention thus allows an insert placed inside a composite sandwich panel to be held and the zone of the panel in which the insert is arranged to be reinforced mechanically. Furthermore, the composition according to the invention allows the fire resistance of the composite sandwich panel to be improved, without significantly increasing the mass of said panel.

EXAMPLE 1

A composition comprising 1 kg of phenolic resin CEL-LOBOND® J2042L® marketed by HEXION and 550 g of hollow glass particles having an average diameter of 70 μm (measured by screening) is prepared. Such a composition therefore comprises 35 wt. % glass particles. No catalyst or curing agent for the phenolic resin is added to the composition. The phenolic resin and the glass particles are brought into contact and mixed in a RUBIMIX® L-120-R kneader marketed by RUBI.

A cellular honeycomb material having a thickness of 15 mm made of NIDA HOMEX®, formed of a matrix of phenolic resin and of aramid fibres, marketed by HEXCEL, is prepared. Moreover, plies of prepregs comprising an epoxy polymer matrix and glass and carbon fibres are chosen. Three plies of honeycomb prepregs are placed on a working surface, and the cellular material is arranged on the first three plies of prepregs. The previously prepared composition is arranged within all the voids of the cellular material, and three further plies of prepregs are placed on top of the cellular material whose voids are filled with said composition. Each ply of prepregs has a thickness of 0.1 mm. The composite sandwich material so prepared therefore has a thickness of 15.6 mm.

The composite sandwich material so prepared is then subjected to a step of polymerisation at 150° C. in an oven and under a vacuum obtained by means of a MINIVAC 1 PS® PS5® pump marketed by MIL'S (Genas, France). The total duration of the polymerisation cycle is 4 hours and 50 minutes (rise in temperature of 2° C/minute for 50 minutes, from 22° C. to 150° C.; maintenance at the temperature of 150° C. for 2 hours; then cooling for one hour with ventilation to a temperature of 22° C.).

EXAMPLE 2

A composition comprising 1 kg of phenolic resin CELLOBOND® J2042L® marketed by HEXION and 550 g of hollow phenolic resin particles (BJO-0930® marketed by Asia Pacific Microspheres) having an average diameter of 90 μm (measured by screening) and a density of 0.228 is prepared. Such a composition therefore comprises 35 wt. % phenolic resin particles. No catalyst or curing agent for the phenolic resin is added to the composition. The phenolic resin and the particles of phenolic resin are brought into contact and mixed in a RUBIMIX® L-120-R kneader marketed by RUBI.

A cellular honeycomb material having a thickness of 15 mm made of NIDA HOMEX®, formed of a matrix of phenolic resin and of aramid fibres, marketed by HEXCEL, is prepared. Moreover, plies of prepregs comprising a polymer matrix based on phenolic resin and glass and carbon fibres are chosen. Three plies of honeycomb prepregs are placed on a working surface, and the cellular material is arranged on the first three plies of prepregs. The previously prepared composition is arranged within all the voids of the cellular material, and three further plies of prepregs are placed on top of the cellular material whose voids are filled with said composition. Each ply of prepregs has a thickness of 0.1 mm. The composite sandwich material so prepared therefore has a thickness of 15.6 mm.

The composite sandwich material so prepared is then subjected to a step of polymerisation at 110° C. in an oven and under a vacuum obtained by means of a MINIVAC 1 PS® PS5® pump marketed by MIL'S (Genas, France). The total duration of the polymerisation cycle is 5 hours and 50 minutes (rise in temperature of 2° C/minute for 50 minutes, from 22° C. to 110° C.; maintenance at the temperature of 150° C. for 3 hours; then cooling for one hour with ventilation to a temperature of 22° C.).

EXAMPLE 3

A composition and a composite sandwich material are prepared in accordance with Example 1. Polymerisation of the composite sandwich material is carried out in the same manner as in Example 1 but in an autoclave at a pressure of 1.5 MPa.

EXAMPLE 4

A composition and a composite sandwich material are prepared in accordance with Example 2. Polymerisation of the composite sandwich material is carried out in the same manner as in Example 2 but in an autoclave at a pressure of 1.5 MPa.

Each of the composite sandwich materials prepared in Examples 1 to 4 permits simultaneous polymerisation of the polymer matrix of the outer skins of the composite sandwich material and of the phenolic resin of the composition filling the cells of the composite sandwich material, without any leak of the composition or any phenomenon of foaming. In particular, no air bubble was noted within the composition filling the cells of the composite sandwich material.

Each of the composite sandwich materials prepared in Examples 1 to 4 further exhibits excellent fire resistance in tests in which a portion of said panel is exposed to a flame, such as a flame formed by a Bunsen burner for 60 seconds.

COMPARATIVE EXAMPLE

A composition comprising 50 wt. % phenolic resin CELLOBOND® J2042L® marketed by HEXION, 35 wt. % hollow glass particles and 5 wt. % catalyst of the polymerisation of the phenolic resin is prepared. The phenolic resin and the glass particles are brought into contact and mixed in a RUBIMIX® L-120-R kneader marketed by RUBI.

A cellular honeycomb material having a thickness of 15 mm made of NIDA HOMEX®, formed of a matrix of phenolic resin and of aramid fibres, marketed by HEXCEL, is prepared. Moreover, plies of prepregs comprising an epoxy polymer matrix and glass and carbon fibres is chosen. Three plies of honeycomb prepregs are placed on a working surface, and the cellular material is arranged on the first three plies of prepregs. The previously prepared composition is arranged within all the voids of the cellular material, and three further plies of prepregs are placed on top of the cellular material whose voids are filled with said composition. Each ply of prepregs has a thickness of 0.1 mm. The composite sandwich material so prepared therefore has a thickness of 15.6 mm.

The composite sandwich material so prepared is then subjected to a step of polymerisation at 150° C. in an oven at atmospheric pressure. The total duration of the polymerisation cycle is 4 hours and 50 minutes (rise in temperature of 2° C/minute for 50 minutes, from 22° C. to 150° C; maintenance at the temperature of 150° C. for 2 hours; then cooling for one hour with ventilation to a temperature of 22° C.).

Foaming of the phenolic resin is observed during the polymerisation, which causes deformation of the outer skins of the composite sandwich material and does not allow a satisfactory composite sandwich material to be obtained. Furthermore, the mechanical properties of the composite sandwich material so obtained are very poor owing to the many air bubbles present within the material.

The invention can be the subject of a very large number of variant embodiments. In particular, it is possible to use a composition according to the invention for other applications, for example as an adhesive for composite materials.

The invention claimed is:

1. A composite sandwich material comprising at least one cellular material having voids, said cellular material being arranged between at least two outer skins, each outer skin being formed of at least one composite material comprising at least one reinforcement in the form of fibres and at least one polymer material, named the polymer matrix, within which the fibres extend, wherein the sandwich material comprises a composition comprising:
   at least one binder chosen from phenolic resins,
   particles formed of at least one pulverulent solid selected from the group consisting of glass, polymers, silica and mixtures thereof, said particles having an average size of less than 1mm,
   from 34 wt. % to 50 wt. % of said pulverulent material, based on the total weight of said composition,
   said at least one binder and particles providing a fire resistance
   and:
   said composition is free of a catalyst or a curing agent of said binder,
   at least some of the voids of said cellular material are filled with said composition, and said composition contains no additive and no filler that would reduce the fire resistance, wherein said cellular material is chosen from materials having a honeycomb structure.

2. A process for preparing a material, named a composite sandwich material, comprising at least one cellular material having voids, said cellular material being arranged between at least two outer skins, each outer skin being formed of at least one composite material comprising at least one reinforcement in the form of fibres and at least one polymer material, named the polymer matrix, within which the fibres extend, said process comprising:

preparing a composition comprising:
at least one binder chosen from phenolic resins, from 34 wt. % to 50 wt. % particles formed of at least one pulverulent solid chosen from glass, polymers, silica and mixtures thereof, based on the total weight of the composition, said particles having an average size of less than 1 mm, said composition being free of a catalyst or a curing agent of said binder, said at least one binder and particles providing a fire resistance, filling at least some of the voids of said cellular material with said composition, polymerizing said binder at a temperature of from 110° C. to 250° C., wherein said composition contains no additive and no filler that would reduce the fire resistance, and wherein said cellular material is chosen from materials having a honeycomb structure.

3. The process according to claim 2, further comprising subjecting said composite sandwich material to a temperature of from 120° C. to 180° C. and to a pressure of from 100,000 Pa to 700,000 Pa.

4. The process according to claim 3, wherein the polymerizing of said binder is carried out simultaneously with polymerization of the polymer matrix of said composite material at a temperature of from 110° C. to 250° C.

5. The process according to claim 2, wherein the polymerizing of said binder is carried out simultaneously with polymerization of the polymer matrix of said composite material at a temperature of from 110° C. to 250° C.

* * * * *